United States Patent [19]

Kawamura et al.

[11] 4,225,021
[45] Sep. 30, 1980

[54] ANTI-SQUEAL SHIM USED IN A DISC-BRAKE

[75] Inventors: Koji Kawamura, Susono; Hideyuki Hayashi, Mishima, both of Japan

[73] Assignee: Toyota Jidosha Kogyo Kabushiki Kaisha, Aichi, Japan

[21] Appl. No.: 11,565

[22] Filed: Feb. 12, 1979

Related U.S. Application Data

[63] Continuation of Ser. No. 848,771, Nov. 4, 1977, abandoned.

[30] Foreign Application Priority Data

Jan. 10, 1977 [JP] Japan .................................. 52-1252

[51] Int. Cl.³ ............................................ F16D 65/00
[52] U.S. Cl. .................................................. 188/73.5
[58] Field of Search ................. 188/73.5, 71.6, 205 A, 188/264 G; 192/30 V

[56] References Cited

U.S. PATENT DOCUMENTS

| 3,506,098 | 4/1970 | Anders | 188/73.5 |
| 3,684,061 | 8/1972 | Ogawa et al. | 188/73.5 |
| 3,885,651 | 5/1975 | Odier | 188/73.5 |
| 3,918,555 | 11/1975 | Rath | 188/73.5 |
| 4,093,045 | 6/1978 | Kawamura | 188/73.5 |

FOREIGN PATENT DOCUMENTS

| 260807 | 7/1965 | Australia | 188/205 A |
| 50-118383 | 9/1975 | Japan | 188/73.5 |
| 50-118388 | 9/1975 | Japan | 188/73.5 |

Primary Examiner—George E. A. Halvosa
Attorney, Agent, or Firm—Browdy and Neimark

[57] ABSTRACT

An anti-squeal shim used in a disc-brake, wherein a disc is urged by a friction pad assembly (or assemblies), as an insertion placed between the pad assembly and an urging means for pressing the pad assembly onto the disc, which shim is made solely of metal, in particular aluminum or aluminum-based alloy, or brass, with the object of enhancing the durability as well as the squeal preventing ability.

10 Claims, 3 Drawing Figures

ANTI-SQUEAL SHIM USED IN A DISC-BRAKE

This is a continuation of application Ser. No. 848,771, filed Nov. 4, 1977 now abandoned.

BACKGROUND OF THE INVENTION

This invention relates to an improvement of an anti-squeal shim for use in a disc-brake, more particularly to the provision of an anti-squeal shim excellent in durability as well as squeal preventing effect.

In a disc-brake wherein a pair of friction pad assemblies are urged onto a disc in order to decelerate or stop the rotation of the disc, frequent occurrence of unagreeable noise has been experienced, which is generally denominated squeal.

For preventing this phenomenon not a few attempts have been made, among which placing of a shim, a plate-like piece having an elastic characteristic, between the backing plate of the friction pad assembly and the urging means thereonto, that is a piston or a caliper in some cases, in a sandwiched state are popular ones. The sandwich-like insertion of a shim is considered to be a fairly effective way of preventing the squeal because of its strong vibration restricting function, and widely adopted for the purpose.

It is a piece of soft steel plate thinly coated with rubber on opposite surfaces thereof. Since the backing plate of the pad assembly and the urging means such as piston abut respectively on the rubber coated surface of the shim, rather softly or in a less rigid way, the contact with these members can be made mild or soft, which leads to a decrease or elimination of the squeal caused by the frictional vibration.

Such a rubber coating over the shim surface is, however, liable to be affected by high temperature and high load. Sudden or repeated applying of a disc-brake, which is observed for example when a vehicle runs along a long downward slope, often causes crushing or damage of the rubber coating over the shim by the repetition of the brake operation and in some cases gives rise to deterioration thereof due to frictional heat which is known to produce a temperature as high as 200° C. Such a degeneration of the rubber coating may completely spoil the anti-squeal feature of a shim, bringing about a new problem.

SUMMARY OF THE PRESENT INVENTION

The present invention has been made with such a background, aiming at the provision of an anti-squeal shim of highly improved quality, which is fully resitive to the high temperature and high pressure (high load) owing to a severe burden caused by, for example, a sudden or repeated applying of the brake operation and fully durable while permanently keeping a good anti-squeal characteristic.

It is an object of this invention to provide a novel and ideal shim, which is to be sandwiched between the friction pad assembly urged onto the disc of a disc-brake and the urging means for pressing the pad assembly toward the disc, by manufacturing the same of a metallic material selected from the group consisting of aluminum, aluminum alloys, and brass based on Cu and Zn.

DETAILED DESCRIPTION OF THE INVENTION

Only through the conversion of material for shims from rubber coated soft steel plate to the abovementioned aluminum family metals or brass, which are of little decrementability and not considered to be anti-vibrating, a wonderful and unexpected anti-squeal effect has been attained.

Figure 1:
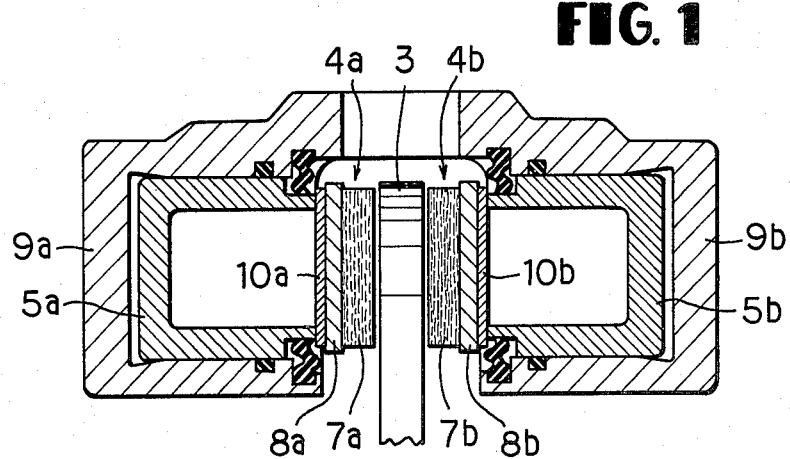
FIG. 1 is a sectional view of an essential part of a disc-brake incorporating a shim in accordance with a first embodiment of the present invention.

FIG. 1 shows a cross section of an essential part of a disc-brake system incorporating a shim of this invention, in which 3 denotes a disc and a pair of friction pad assemblies 4a and 4b are disposed on opposite sides thereof. They are urged onto the disc 3 by an urging means respectively, that is pistons 5a and 5b. Constituting members of the friction pad assembly, that is, a pair of friction pads and a pair of backing plates therefor are respectively denoted with 7a and 7b, and 8a and 8b.

As can be seen in FIG. 1, a pair of shims 10a and 10b made of a piece of aluminum plate made substantially of aluminum, in this embodiment, are inserted in a sandwich-like state, between the pistons 5a and 5b, which are actuated by pressurized fluid supplied into a pair of cylinders 9a and 9b respectively, and the friction pad assemblies 4a and 4b.

The urging or pressing force by the pair of pistons 5a and 5b is delivered onto the friction pad assemblies 4a, 4b through (by way of) the aluminum shims 10a, 10b, which will not crush the shims, even though a high load is acted thereon. In the case of a high temperature being created at the shims 10a, 10b due to the frictional heat generated between the friction pad assemblies 4a, 4b and the disc 3, that high temperature will not affect adversely the shims 10a, 10b.

Figure 2:
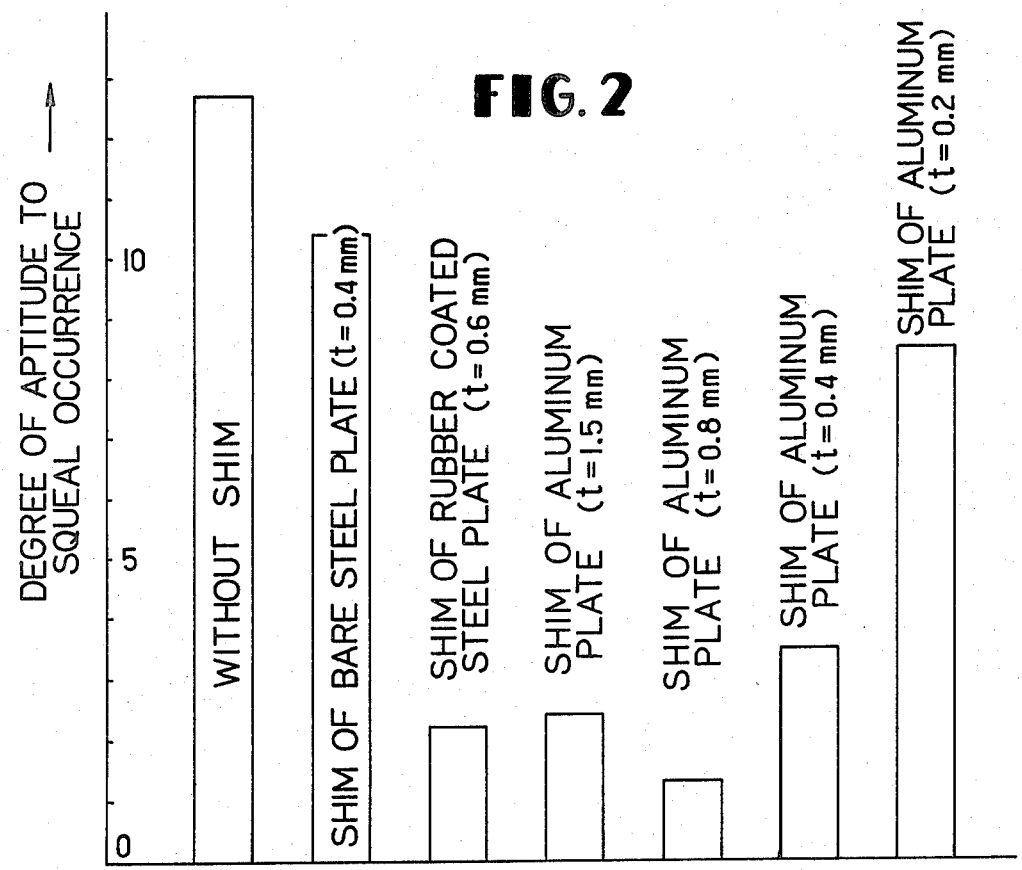
FIG. 2 is a graph showing the experimental data measured on some kinds of shims for illustrating the degree of aptitude to squeal according to the type respectively.

In regard to the questioned anti-squeal feature the invented shims show a far superior effect as shown in the graph of FIG. 2, which illustrates an actually experimented data concerning the degree of aptitude to squeal occurrence, that is, in other words, a total judgement on a shim passed by frequency, magnitude, etc. of the squeal according to the type of shims such as, of bare steel plate, of rubber coated steel plate and, of aluminum plate in various degreee of thickness (t). As can be clearly recognized in the graph of FIG. 2 a shim of bare steel plate shows little effect to prevent squeal when placed between the backing plate of a friction pad assembly and the piston or the caliper, while a shim of conventional rubber coated steel plate exhibits a fairly high effect of squeal prevention and the aluminum one according to the present invention exhibit substantially equal or more highly effective squeal preventing capability. In particular shims of thickness in the range between 0.4 and 1.5 mm are remarkably effective in squeal prevention; and shims of thickness about 0.8 mm are the best, so long as the squeal prevention is concerned. It is also a noticeable characteristic of this invention that shims of fairly large thickness are highly effective in squeal prevention, because of the characteristic of the material, in comparison with the conventional steel plate shims coated with rubber thereover.

As the material of this type shims aluminum can be replaced by, without degrading its effect even a bit, one of aluminum alloys in which aluminum in the major component, or by brass based on Cu and Zn.

Figure 3:
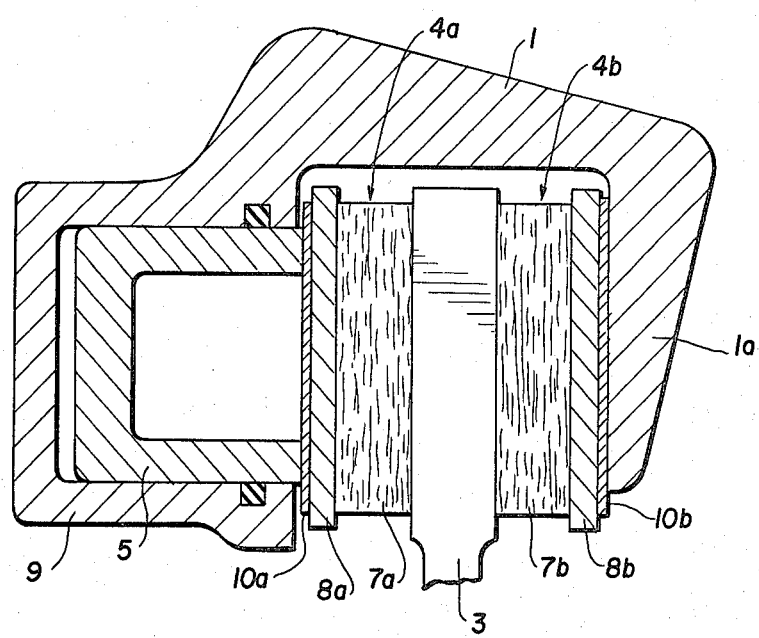
FIG. 3 is a sectional view similar to FIG. 1 of a second embodiment of a disc brake incorporating a shim in accordance with the present invention.

The application of this type shim is not limited to an opposed-cylinder type disc-brake, as shown in this embodiment, but favorably used in a so-called single-cylinder type disc-brake wherein a caliper 1 is shifted from right to left, in FIG. 3, owing to the reaction as is well known, when the brake fluid is supplied into the cylinder 9, while urging on one side of the disc 3 with a friction pad assembly 4a due to the operation of the piston 5, with the result of urging, with another friction pad assembly 4b, onto the other side of the disc 3. The shims 10a and 10b in this embodiment are inserted in a disc brake, having the above-mentioned construction, respectively between the piston 5 and the backing plate 8a of the friction pad assembly 4a as well as between a pawl or a lug 1a of the caliper 1 and the backing plate 8b of the friction pad assembly 4b. In some cases a shim can be inserted only on one side of the disc-brake system. Various types of shim configuration conventionally known are also applicable to the shims in this invention, not being limited to a simple plate like one, such as a shim having a notch portion, a shim having a cut-away portion in a part of it, and a shim having a rugged surface. It can even be said a great feature of this invention that various forms are applicable to the shims in accordance with this invention, because they are made of metallic plate without rubber-coating unlike the conventional shims.

It should be noted that a coated shim is not only affected by the life of coating but also subject to the change of the surface nature by wearing of the coating, however, a metallic shim in accordance with the present invention is not subjected to any change of surface nature even after it has been worn thin.

To sum up the characteristics of this invention, it has succeeded in the provision of a novel shim which is highly improved in the durability even under the high temperature and high pressure condition while having fairly increased the degree of squeal preventing effect. In addition, it is another important feature of this invention to have succeeded in the manufacturing of a shim of high squeal preventive ability by using metallic material of little decrementability.

It will be obvious to those skilled in the art that various changes may be made without departing from the scope of the invention and the invention is not to be considered limited to what is shown in the drawings and described in the specification.

What is claimed is:

1. An anti-squeal shim arrangement used for a disc-brake, the arrangement comprising a rotatable disc, a pair of friction pad assemblies, means for urging each of said friction pad assemblies toward said disc, and a respective shim inserted in a sandwich-like manner between each of said friction pad assemblies and said urging means, each said shim consisting solely of a respective plate of a metallic material selected from the group consisting of aluminum, aluminum-based alloys and brass, said plates being free of all coatings, and constructed and arranged to have metal surfaces in direct contact with said urging means and with respective ones of said friction pad assemblies throughout the operating life of said shims without any intervening substances.

2. An anti-squeal shim arrangement in accordance with claim 1, wherein said urging means comprise a pair of pistons, and wherein said shims are inserted respectively between a respective one of said pistons and a respective one of said friction pad assemblies.

3. An anti-squeal shim arrangement in accordance with claim 1, wherein said urging means is a caliper and said shims are inserted between said caliper and respective ones of said friction pad assemblies.

4. An anti-squeal shim arrangement in accordance with claim 1, wherein said shims consist of respective pieces of aluminum plate havng a thickness ranging between substantially 0.4 and substantially 1.5 mm.

5. An anti-squeal shim arrangement in accordance with claim 1, wherein said shims consist of respective pieces of aluminum plate having a thickness substantially 0.8 mm.

6. An anti-squeal shim arrangement used for a disc-brake, the arrangement comprising a rotatable disc, at least one friction pad assembly, means for urging said friction pad assembly toward said disc, and a shim inserted in a sandwich-like manner between said friction pad assembly and said urging means, said shim consisting solely of a plate made of a metallic material selected from the group consisting of aluminum, aluminum-based alloys and brass, said plate being free of all coatings and, constructed and arranged to have metal surfaces in direct contact with said urging means and said friction pad assembly throughout the operating life of said shim without any intervening substances.

7. An anti-squeal shim arrangement in accordance with claim 6, wherein said urging means is a piston, and said shim is inserted between said piston and said friction pad assembly.

8. An anti-squeal shim arrangement in accordance with claim 6, wherein said urging means is a caliper and said shim is inserted between said caliper and said friction pad assembly.

9. An anti-squeal shim arrangement in accordance with claim 6, wherein said shim consists of a piece of aluminum plate having a thickness ranging between substantially 0.4 and substantially 1.5 mm.

10. An anti-squeal shim arrangement in accordance with claim 6, wherein said shim consists of a piece of aluminum plate having a thickness of substantially 0.8 mm.

* * * * *